United States Patent [19]
Oestmann

[11] 3,828,873
[45] Aug. 13, 1974

[54] HIGH DRIVE-TRACK-TYPE VEHICLE

[75] Inventor: Eldon D. Oestmann, Washington, Ill.

[73] Assignee: Caterpillar Tractor Co., Peoria, Ill.

[22] Filed: Aug. 28, 1972

[21] Appl. No.: 283,968

[52] U.S. Cl. ............... 180/9.5, 180/9.62, 214/131, 305/25
[51] Int. Cl. .................................... B62d 55/12
[58] Field of Search .......... 180/9.62, 9.5, 9.4, 9.54; 214/131; 305/25

[56] References Cited
UNITED STATES PATENTS

| | | | |
|---|---|---|---|
| 1,326,702 | 12/1919 | White | 305/27 |
| 1,330,253 | 2/1920 | Fuller | 305/25 |
| 1,485,104 | 2/1924 | White | 180/9.62 |
| 1,512,152 | 10/1924 | White | 305/25 |
| 1,808,735 | 6/1931 | Henneuse | 305/25 |
| 2,326,338 | 8/1943 | Drott | 214/131 |
| 2,391,002 | 12/1945 | Baker | 180/9.62 |
| 2,467,947 | 4/1949 | Skelton | 180/9.62 X |

*Primary Examiner*—Richard J. Johnson
*Attorney, Agent, or Firm*—Phillips, Moore, Weissenberger Lempio & Strabala

[57] ABSTRACT

A track-type vehicle comprises a main frame having a pair of longitudinally spaced idlers rotatably mounted on each side thereof. A drive sprocket is rotatably mounted directly on the frame, between each pair of idlers. Each drive sprocket is positioned vertically above and substantially closer to a first idler of each pair of idlers than to a second idler thereof. A triangularly shaped endless track assembly is entrained about each repective drive sprocket and pair of idlers and a bogey system is mounted on the frame to engage the track assembly, between the idlers.

20 Claims, 4 Drawing Figures

HIGH DRIVE-TRACK-TYPE VEHICLE

BACKGROUND OF THE INVENTION

Conventional track-type tractors comprise a generally elliptically-shaped endless track assembly mounted on a front idler and a rear drive sprocket. The drive sprocket performs the combined functions of driving the track assembly, supporting a substantial portion of the tractor's weight and absorbing loads imposed on the vehicle during operation of attached work implements. In addition, the drive sprocket is positioned closely adjacent to ground level to thus subject it to wear and damage. The wrap angle about the sprocket approximates 180°, which tends to excessively load a substantial number of track bushings and pins during vehicle operation.

Attempts have been made to provide triangularly-shaped track assemblies with a drive sprocket which is positioned vertically above front and rear idlers. Examples of such constructions are disclosed in U.S. Pat. Nos. 986,391; 1,204,799; 1,204,808; 1,512,152; 1,641,331; 2,341,000; 2.745,654; 2,984,522; 3,038,265; and 2,172,707. To date such prior art track-type vehicles have failed to replace conventional track-type tractors, of the type mentioned above, in the commercial market place.

SUMMARY OF THE INVENTION

An object of this invention is to provide a track-type vehicle which has its final drive system sufficiently elevated to protect it against damage, has a power train to the drive system which is non-complex and which is disposed in the vehicle for optimum performance, and which exhibits high degrees of working efficiency, structural integrity, stability and operator visibility. The vehicle comprises a main frame having a pair of longitudinally spaced idlers rotatably mounted on each side thereof. A drive sprocket is rotatably mounted directly on each side of the frame, between a respective pair of the idlers, and is positioned vertically above and substantially closer to a first idler of such pair of idlers than to a second idler thereof. An endless track assembly, having the general shape of a scalene triangle, is positioned on each side of the frame and is entrained about a respective one of the drive sprockets and pair of idlers. A suspension means, including a bogey system, is mounted on the frame to engage the track assembly, between the first and second idlers.

In the preferred embodiment of this invention, the idlers and suspension means are mounted on a sub-frame which is pivotally mounted on the main frame, adjacent to the drive sprockets.

BRIEF DESCRIPTION OF THE DRAWINGS

Further objects of this invention will become apparent from the following description and accompanying drawings wherein.

DETAILED DESCRIPTION

Figure 1:
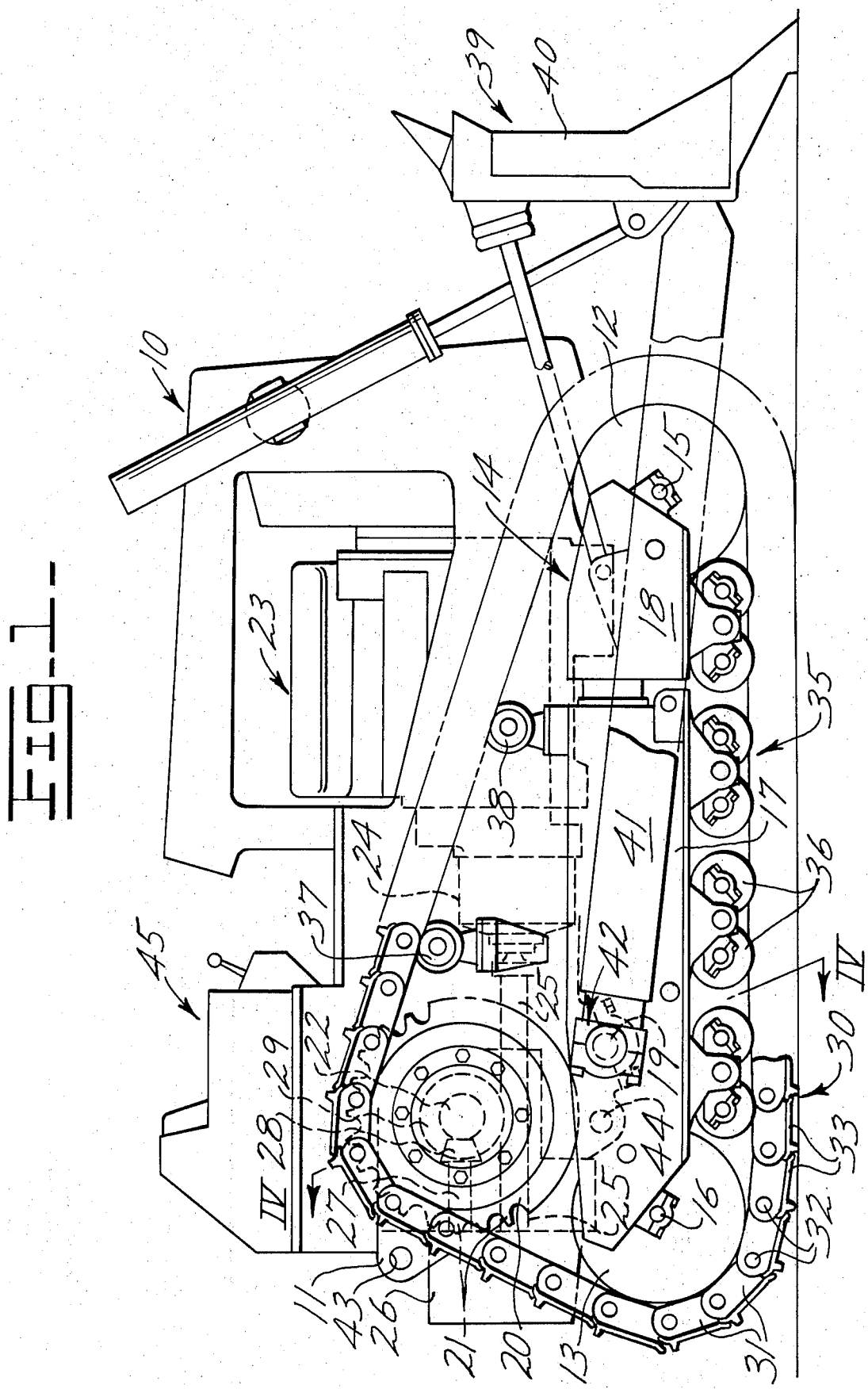
FIG. 1 is a side elevational view of a track-type vehicle embodying this invention.

FIG. 1 illustrates a track-type vehicle 10 comprising a main frame 11 and a pair of longitudinally-spaced idlers 12 and 13 (tread or sprocket-type), rotatably mounted on a track roller or sub-frame 14 by axles 15 and 16, respectively. The sub-frame comprises telescopically disposed sections 17 and 18, with section 17 being pivotally mounted on the main frame by a common pivot means or pin 19 extending transversely through the frames. A suitable recoil mechanism (not shown) is disposed between and within the sections and may be of the type disclosed in U.S. application Ser. No. 282,698, filed on Aug. 22, 1972 by Eldon D. Oestmann and Ronald L. Krolak for "Track Frame Reciprocating Mechanism For Track-Type Tractors," assigned to the assignee of this application.

Figure 4:
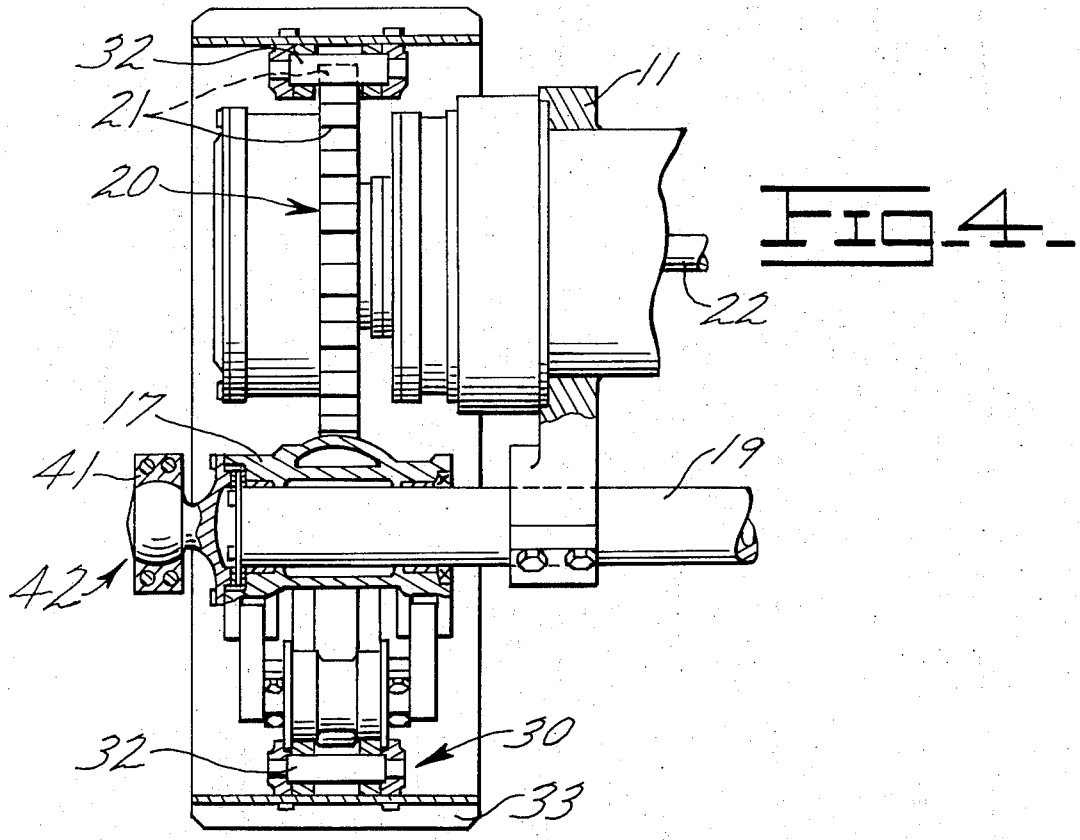
FIG. 4 is a sectional view taken in the direction of arrows IV—IV in FIG. 1, illustrating the mounting of a drive sprocket and track roller frame on a main frame of the vehicle.

A drive sprocket 20, having a plurality of teeth 21 formed thereon, is rotatably mounted directly on the main frame by a drive input shaft 22 of a final drive (FIG. 4). The sprocket is preferably positioned substantially closer (see corridor "R" in FIG. 2) to first idler 13 than to second idler 12. An internal combustion engine 23 is sequentially connected to the sprocket's drive input shaft by power train means comprising a torque converter package 24, a power output shaft 25, a power shift transmission 26, an output shaft 27 from the transmission, a drive pinion 28 secured to output shaft 27 and a bevel or face gear 29 which meshes with pinion 27. Such power train means is preferably disposed in general longitudinal alignment between the engine and drive sprocket, as illustrated in FIG. 1, and preferably has substantial portions thereof disposed vertically below the rotational axis of sprocket 20.

An endless track assembly 30, having the general shape of a scalene triangle, is entrained about sprocket 20 and idlers 12 and 13. The track assembly comprises an articulated link assembly having a plurality of links 31 pivotally interconnected by pivot pin and bushing assemblies 32, and a plurality of track shoes 33 secured to the links in a conventional manner. As shown in FIGS. 1 and 4, teeth 21 of sprocket 20 engage the pin and bushing assemblies which comprise drivers to normally drive the track clockwise to propel the vehicle forwardly, along a longitudinal axis thereof. Examples of alternative types of drivers are disclosed in U.S. Pat. No. 3,567,294, assigned to the assignee of this application.

FIG. 1 further depicts a suspension means including a bogey system 35, having pivoted rollers 36 engaging the portion of the track assembly between idlers 12 and 13, finding particular application in the track-type vehicle of this invention. Such bogey system is fully disclosed in U.S. application Ser. No. 212,396, filed on Dec. 27, 1971 by Robert J. Purcell et al. for "Triangular Track Resilient Bogey Suspension," assigned to the assignee of this application. As clearly shown in FIG. 11 of such application, the two outer pairs of rollers are each rotatably mounted on a bellcrank pivotally mounted on the sub-frame between each such pair of rollers and a respective axle 15 or 16. The two inner pairs of rollers are each rotatably mounted on a lever pivotally mounted to the sub-frame by a pivot pin (unnumbered).

At least one pair of support rollers 37 and 38 engage and support the portion of the track assembly extending between idler 12 and sprocket 20. In the preferred embodiment of this invention, roller 37 is mounted on main frame 11 whereas roller 38 is mounted on section 17 of sub-frame 14.

FIG. 1 further discloses a work implement preferably comprising a bulldozer 39 having a blade 40 universally connected to the forward ends of laterally spaced push arms 41 (one shown). The rearward end of each push arm is preferably pivotally mounted on pivot shaft 19 by a ball and socket connection 42 (FIG. 4). Such arrangement assures the transmittal of a substantial portion of the thrust loads, imposed on the blade, to main frame 11 directly. If so desired, a work implement, such as a conventional ripper attachment, could be pivotally mounted on the rearward end of the vehicle by means of mounts 43 and 44 (FIG. 1).

Figure 2:
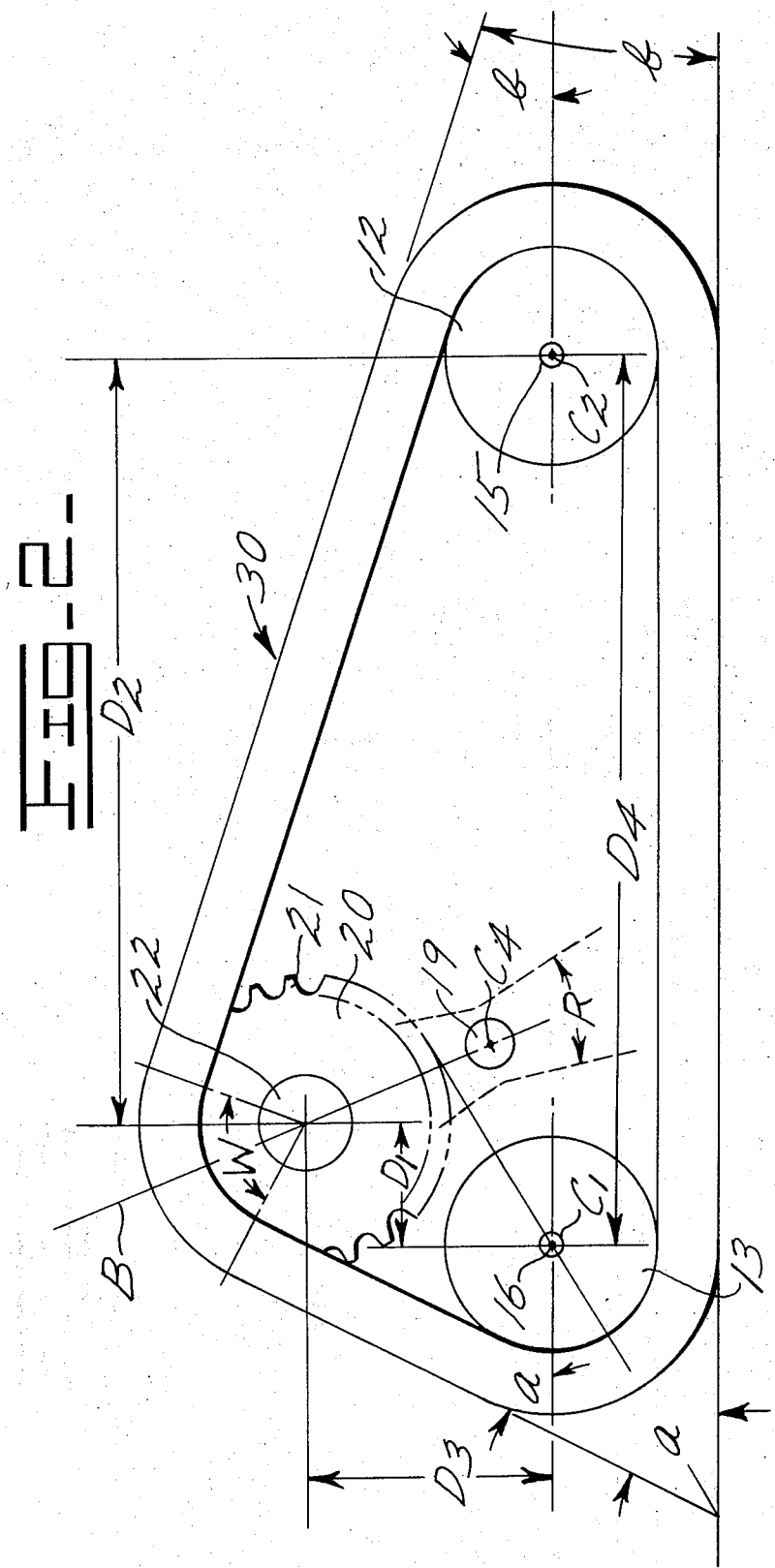
FIG. 2 schematically illustrates a triangularly-shaped endless track assembly with geometric design relationships superimposed thereon.

FIG. 2 schematically illustrates a number of geometric design relationships employed in the track-type vehicle of this invention. In the preferred embodiment, angle $a$, depicting the angle between a horizontal line intersecting axes $C_1$ and $C_2$ of idlers 13 and 12, respectively, and the generally straight portion of the track assembly extending between idler 13 and sprocket 20, is preferably selected from the range of from 30° to 90°. An angle less than 30° would move pivot 19 to an excessively low position to adversely affect ground clearance and to interfere with track components. Above 90°, the sprockets would be placed rearwardly of the vehicle to interfere with rear mounted implements, such as rippers, and an excessively long track assembly would be required.

$D_1$, the horizontal distance between axis $C_1$ and axis $C_3$ of the drive sprocket, is preferably substantially less than $D_2$ (including $D_1 = 0$), with $D_2$ depicting the horizontal distance between axes $C_2$ and $C_3$. Such relationship assures that the sprocket will be placed in an optimum location for design considerations such as weight distribution, drive train location, operator visibility, and ground clearance. $D_3$, the vertical distance between axes $C_1$ and $C_3$, is preferably no greater than $0.6D_4$ to maintain the vehicle's center of gravity sufficiently low and to otherwise stabilize the vehicle.

Wrap angle $w$ for drive sprocket 20 is preferably substantially bisected by an imaginary line B which intersects axes $C_3$ and $C_4$. The wrap angle is preferably less than 115° (when $a$ equals 90°) and is sufficiently large to permit the effective engagement of at least two sprocket teeth 21 with drivers 32 of track assembly 30. The minimum wrap angle preferably equals the number of effective teeth ($N_2$) which engage drivers of the track assembly times 360° divided by the total number of track engageable effective sprocket teeth. A less than two-tooth engagement would cause excessive loading at the engaged tooth and the track assembly would tend to "jump-out" of its sprocket engagement. A wrap angle greater than 115° would create the conditions mentioned above, with reference to employing an angle $a$ which is greater than 90°.

The term "effective teeth" as used herein is defined as the teeth which are adapted to engage respective drivers (e.g., the pin and bushing assemblies of the track assembly). For example, FIG. 1 illustrates three teeth in effective engagement with drivers employed in the track assembly. The FIG. 1 sprocket, wherein alternate teeth are in non-engaging relationship with the track assembly, is called a "hunting tooth sprocket" to increase the life expectancy of the sprocket teeth.

In the specific embodiment illustrated, the sprocket has twenty-seven teeth formed thereon, wrap angle $w$ (FIG. 2) closely approximates 80°, angle $a$ approximates about 66° and angle $b$ approximates about 18°. The disposition and mounting of the drive sprocket assures that it is sufficiently elevated from the ground to prevent it from being damaged or worn. The drive sprocket solely functions as a power input to the track assembly and thus does not constitute a structural supporting member for the vehicle and attached implements. In addition, the positioning of the sprocket generally vertically below an operator's station 45 aids in providing the operator with a relatively high degree of visibility.

Figure 3:
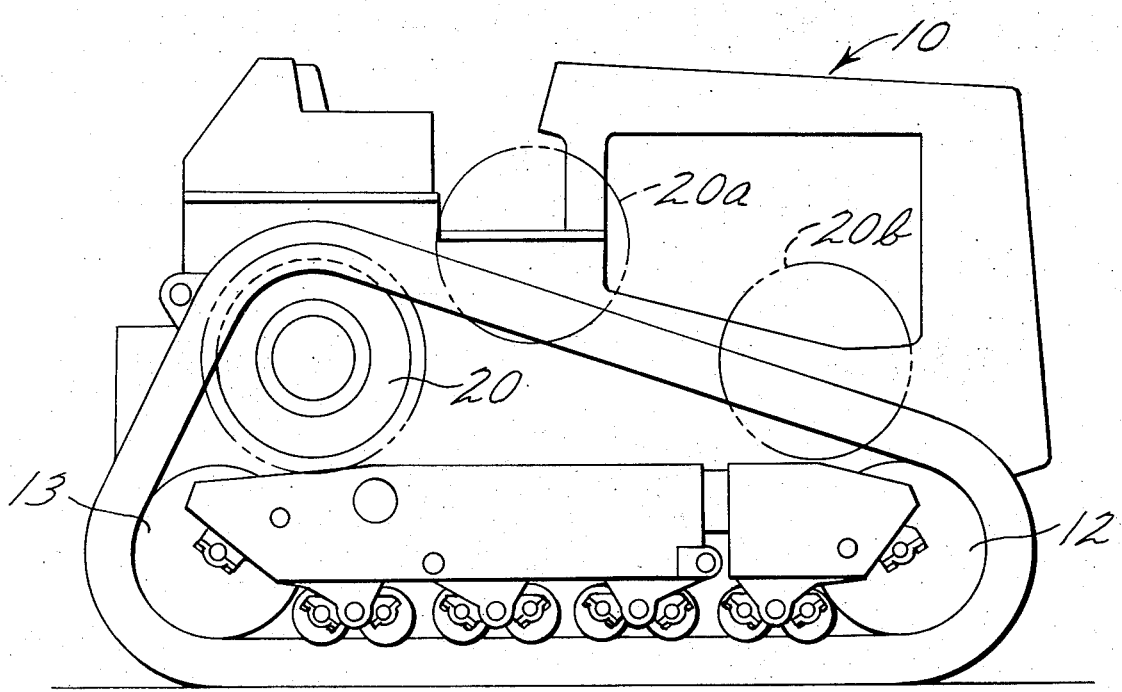
FIG. 3 is a view similar to FIG. 1, but schematically illustrating various positions of a drive sprocket employed in the vehicle.

Such relationships are illustrated in FIG. 3 wherein location of sprocket 20 at position 20a would give rise to a number of the aforementioned problems, i.e., wherein the track assembly assumes the shape of an isosceles triangle. It should be understood that in certain vehicle applications the sprocket could be located at position 20b, i.e., at the forward rather than at the rearward end of the vehicle. In such alternative application, the attendant vehicle components and drive system would be suitably modified and rearranged to accommodate same.

What is claimed is:

1. A track-type vehicle disposed for movement along a longitudinal axis thereof comprising:
   a main frame,
   a sub-frame disposed on each lateral side of said vehicle,
   a pair of longitudinally spaced idlers rotatably mounted on each end of each sub-frame,
   a drive sprocket rotatably mounted directly on each side of said main frame and positioned longitudinally between and vertically above a respective pair of idlers and further positioned substantially closer to a first idler of such pair of idlers than to a second idler thereof,
   an endless track assembly, having the general shape of a scalene triangle, positioned on each side of said main frame and entrained about a respective one of said drive sprockets and pair of idlers,
   suspension means, including rollers and means interconnecting the rollers and sub-frame for allowing pivotal suspension movement of the rollers relative to the sub-frame, the rollers engaging the portion of said track assembly between a respective pair of said idlers, and
   pivot means pivotally mounting each sub-frame on said main frame, each pivot means located longitudinally between the rotational axis of a respective sprocket and the second idler of a pair of idlers.

2. The vehicle of claim 1 wherein the means interconnecting the rollers and the sub-frame for allowing pivotal suspension movement of the rollers relative to the sub-frame comprise a crank member pivotally connected to the sub-frame and interconnecting the sub-frame with at least one roller, and a lever pivotally mounted to the sub-frame and interconnecting the sub-frame with at least one other roller.

3. The vehicle of claim 1 wherein an imaginary line intersecting the axis of said pivot means and the rotational axis of said sprocket substantially bisects a wrap angle of said track assembly on said sprocket.

4. The vehicle of claim 3 wherein said wrap angle is less than 115° and is sufficiently large to have at least two teeth of said sprocket drivingly engage respective drivers of said track assembly, said wrap angle being greater than 360 times said teeth divided by the total number of track assembly engageable teeth on said sprocket.

5. The vehicle of claim 1 wherein a generally straight portion of said track assembly extending between said sprocket and said first idler, and an imaginary line intersecting the rotational axes of said first and second idlers defines an included angle of from 30° to 90°.

6. The vehicle of claim 5 wherein said included angle approximates about 66°.

7. The vehicle of claim 6 wherein an included angle between said imaginary line and a generally straight portion of said track assembly, extending between said sprocket and said second idler, approximates about 18°.

8. The vehicle of claim 1 wherein a wrap angle about said drive sprocket approximates about 80°.

9. The vehicle of claim 1 wherein the vertical distance between the rotational axes of said first idler and said sprocket is no greater than 0.6 of the longitudinal distance between the rotational axes of said first and second idlers.

10. The vehicle of claim 1 further comprising an operator's station mounted on said vehicle to be generally vertically above said sprocket.

11. The vehicle of claim 1 further comprising at least one support roller mounted on each of said main frame and said sub-frame to engage and support the portion of said track assembly extending between said sprocket and said second idler.

12. The vehicle of claim 1 further comprising a bulldozer assembly having a blade positioned forwardly of said vehicle and a push arm disposed on each side of said vehicle, said push arms each having their forward ends connected to said blade and their rearward ends connected to said pivot means.

13. The vehicle of claim 1 further comprising an engine mounted on said vehicle and power train means operatively connected between said engine and said drive sprocket and disposed in general longitudinal relationship therebetween.

14. The vehicle of claim 13 wherein substantial portions of said power train means are positioned generally below the rotational axis of said drive sprockets and wherein a transmission of said power train means is detachably mounted on a rearward end of said vehicle.

15. The vehicle of claim 1 wherein said drive sprocket is rotatably mounted on a rearward end of said vehicle.

16. The vehicle of claim 1 wherein said drive sprocket is rotatably mounted on a forward end of said vehicle.

17. A track-type vehicle comprising
a main frame,
a sub-frame disposed on each lateral side of said vehicle,
pivot means pivotally mounting each sub-frame on said main frame,
a pair of longitudinally spaced idlers rotatably mounted on each end of each sub-frame, said pivot means positioned longitudinally between said idlers,
a drive sprocket rotatably mounted on each side of said main frame and positioned longitudinally between and vertically above said idlers in closer proximity to a first idler of a respective pair of said idlers than to a second idler thereof, each of said pivot means located longitudinally between the rotational axis of a respective sprocket and the second idler of a pair of idlers,
an endless track assembly having a general shape of a scalene triangle entrained about each drive sprocket and a respective pair of said idlers, an imaginary line intersecting the pivot axis of said pivot means and the rotational axis of said drive sprocket substantially bisecting a wrap angle of said track assembly on said sprocket and
roller means attached on each lateral side of said main frame and supporting a portion of a respective track assembly extending between a sprocket and the second roller of a pair of rollers.

18. A track-type vehicle comprising
a main frame having a drive sprocket rotatably mounted on each lateral side thereof,
a sub-frame disposed on each lateral side of said main frame, each sub-frame having a pair of telescopically disposed sections having a recoil mechanism disposed therein and therebetween,
support means comprising idlers rotatably mounted on each sub-frame,
a triangularly shaped endless track assembly entrained about each drive sprocket and respective idlers,
mounting means, positioned longitudinally between said support means, pivotally mounting each sub-frame on said main frame, and
at least one support roller mounted on each of said main and sub-frames to engage and support a portion of each track assembly positioned longitudinally between a sprocket and one of said idlers.

19. A track-type vehicle comprising
a main frame,
a sub-frame having an endless track assembly mounted thereon,
pivot means pivotally mounting said sub-frame directly on said main frame, and
a work implement having a support arm mounted directly on said pivot means.

20. The vehicle of claim 19 wherein said work implement comprises a bulldozer assembly having a blade positioned forwardly of said vehicle and said support arm comprises a push arm disposed on each side of said vehicle, said push arms each having their forward ends connected to said blade and their rearward ends connected to said pivot means.

* * * * *

UNITED STATES PATENT OFFICE
CERTIFICATE OF CORRECTION

Patent No. 3,828,873    Dated August 13, 1974

Inventor(s) ELDON D. OESTMANN

It is certified that error appears in the above-identified patent and that said Letters Patent are hereby corrected as shown below:

Column 5, Claim 4, line 5, "360" should read --360°--.

Signed and sealed this 31st day of December 1974.

(SEAL)
Attest:

McCOY M. GIBSON JR.
Attesting Officer

C. MARSHALL DANN
Commissioner of Patents